United States Patent
Lim et al.

(10) Patent No.: US 12,544,310 B2
(45) Date of Patent: Feb. 10, 2026

(54) METHOD OF MANUFACTURING ORAL DOSAGE FORMS FOR EXTENDED DRUG RELEASE

(71) Applicant: Craft Health Pte Ltd, Singapore (SG)

(72) Inventors: Seng Han Lim, Singapore (SG); Wei Jiang Goh, Singapore (SG)

(73) Assignee: CRAFT HEALTH PTE LTD., Singapore (SG)

( * ) Notice: Subject to any disclaimer, the term of this patent is extended or adjusted under 35 U.S.C. 154(b) by 754 days.

(21) Appl. No.: 17/801,231

(22) PCT Filed: Mar. 2, 2021

(86) PCT No.: PCT/IB2021/051745
§ 371 (c)(1),
(2) Date: Aug. 19, 2022

(87) PCT Pub. No.: WO2021/176361
PCT Pub. Date: Sep. 10, 2021

(65) Prior Publication Data
US 2022/0409490 A1 Dec. 29, 2022

Related U.S. Application Data

(60) Provisional application No. 62/984,067, filed on Mar. 2, 2020.

(51) Int. Cl.
*A61J 3/07* (2006.01)
*A61M 31/00* (2006.01)
(Continued)

(52) U.S. Cl.
CPC ............ *A61J 3/077* (2013.01); *A61M 31/002* (2013.01); *B33Y 50/00* (2014.12); *B33Y 80/00* (2014.12)

(58) Field of Classification Search
CPC .......... A61J 3/077; B33Y 50/00; B33Y 80/00; A61M 31/002
See application file for complete search history.

(56) References Cited

U.S. PATENT DOCUMENTS

| | | |
|---|---|---|
| 5,198,229 A | 3/1993 | Wong et al. |
| 5,417,682 A | 5/1995 | Wong et al. |

(Continued)

FOREIGN PATENT DOCUMENTS

| | | |
|---|---|---|
| CN | 101181226 A | 5/2008 |
| EP | 1245227 A1 | 10/2002 |

(Continued)

OTHER PUBLICATIONS

Arora et al., "Floating Drug Delivery Systems: A Review", AAPS Pharmaceutical Science and Technology Springer New York LLC vol. 6, No. 3, Oct. 19, 2005, pp. E372-E390.

(Continued)

*Primary Examiner* — Blessing M Fubara
(74) *Attorney, Agent, or Firm* — Kilpatrick Townsend & Stockton LLP (57) ABSTRACT

A method for designing and manufacturing a long release capsule for extended delivery of a drug to a patient in an ingestible capsule. The method includes determining a drug volume to be delivered and a drug delivery rate. A buoyancy element is selected based on the drug volume. A release port is selected based on the drug delivery rate and the properties of the drug. The design elements are used to produce a capsule design for an ingestible capsule. The design of the capsule is used to generate manufacturing instructions and produce the capsule.

11 Claims, 8 Drawing Sheets

(51) Int. Cl.
  *B33Y 50/00*   (2015.01)
  *B33Y 80/00*   (2015.01)

(56) References Cited

U.S. PATENT DOCUMENTS

| | | | |
|---|---|---|---|
| 5,626,876 | A | 5/1997 | Muller et al. |
| 7,931,914 | B2 | 4/2011 | Pryce Lewis et al. |
| 2011/0287096 | A1 | 11/2011 | Gorukanti et al. |
| 2017/0266112 | A1 | 9/2017 | Bellinger et al. |
| 2018/0250226 | A1 | 9/2018 | Betser et al. |

FOREIGN PATENT DOCUMENTS

| | | | |
|---|---|---|---|
| JP | 50121418 A | 9/1975 | |
| JP | 2503087 B2 | 6/1996 | |
| JP | 2001038193 A | 2/2001 | |
| JP | 2001514211 A | 9/2001 | |
| JP | 2004501190 A | 1/2004 | |
| JP | 2004141042 A | 5/2004 | |
| JP | 2005513095 A | 5/2005 | |
| JP | 2005533084 A | 11/2005 | |
| JP | 2005334651 A | 12/2005 | |
| JP | 2007506519 A | 3/2007 | |
| JP | 2007536377 A | 12/2007 | |
| JP | 2008520378 A | 6/2008 | |
| JP | 2008539047 A | 11/2008 | |
| JP | 2009511191 A | 3/2009 | |
| JP | 2010000371 A | 1/2010 | |
| JP | 2013530200 A | 7/2013 | |
| JP | 2014510107 A | 4/2014 | |
| JP | 6322014 B2 | 5/2018 | |
| JP | 2019512468 A | 5/2019 | |
| WO | 03092633 A2 | 11/2003 | |
| WO | 2009144558 A1 | 12/2009 | |
| WO | 2010020098 A1 | 2/2010 | |
| WO | 2012159077 A2 | 11/2012 | |
| WO | 2014014348 A1 | 1/2014 | |
| WO | WO-2016038356 A1 * | 3/2016 | ............. B33Y 50/02 |
| WO | WO-2017158171 A1 * | 9/2017 | ........... A61K 9/2031 |
| WO | 2019025869 A1 | 2/2019 | |
| WO | 2019027372 A1 | 2/2019 | |

OTHER PUBLICATIONS

Goyanes et al., "Fused-Filament 3D Printing (3DP) for Fabrication of Tablets", International Journal of Pharmaceutics, vol. 476, Nos. 1-2, Sep. 30, 2014, pp. 88-92.
Application No. PCT/IB2021/051744, International Preliminary Report on Patentability, Mailed On Sep. 15, 2022, 15 pages.
Application No. PCT/IB2021/051744, International Search Report and Written Opinion, Mailed On Jun. 4, 2021, 20 pages.
Application No. PCT/IB2021/051745, International Preliminary Report on Patentability, Mailed On Sep. 15, 2022, 15 pages.
Application No. PCT/IB2021/051745, International Search Report and Written Opinion, Mailed On Jun. 7, 2021, 20 pages.

* cited by examiner

METHOD OF MANUFACTURING ORAL DOSAGE FORMS FOR EXTENDED DRUG RELEASE

REFERENCE TO RELATED APPLICATION

The application claims the benefit of, and priority to, U.S. Provisional Application No. 62/984,067, filed on Mar. 2, 2020. The entire content of said provisional application is herein incorporated by reference for all purposes.

BACKGROUND

Typically, orally administered drug dosages include liquids or powders administered as compressed tablets, coated tablets, or gelatin capsules containing a single dosage of a selected drug. Dosage regimens often require predetermined schedules of multiple dosages per day or over several days. Controlled release dosage forms involve prolonged delivery of drug formulations at a predetermined rate to maintain a constant or desired drug concentration for a specific period of time. Typical time-release drugs involve an active ingredient embedded in a matrix of insoluble substance such that the drug must escape the matrix before being absorbed into a patient's body. Most extended release products are designed to produce a steady release of active ingredients for up to a few days but cannot last in gastric environments for longer than a few days due to the peristaltic action of the gut moving the dosage from the stomach.

BRIEF SUMMARY

A long release drug system for releasing an active ingredient over a period of time within a patient's stomach. Though the description is described with reference to drugs, the disclosure is intended to cover medicinal products, nutraceuticals, pharmaceuticals, supplements, and other consumable products. Though reference is made throughout to drugs released from a capsule, it is intended that the description covers any releasable agent from the capsule. As used herein, a releasable agent refers to a drug, medicinal products, nutraceuticals, pharmaceuticals, supplements, and/or other consumable products that can be released and that, upon release, can affect properties within a bodily environment. One general aspect includes a long release drug capsule including a first portion having a buoyancy chamber and a first interlocking feature, the buoyancy chamber adjusting the buoyancy of the capsule in gastric fluid. The long release drug capsule also includes a second portion having a drug chamber defining an interior to retain at least one drug and at least one opening in the interior through which the at least one drug is releasable; and a second interlocking feature, the second interlocking feature configured to interface with the first interlocking feature to secure the first portion to the second portion and to fully enclose the drug chamber. The long release drug system is also configured to contain and release one or more drugs mixed with excipients to improve the compaction, dispersion, dissolution, or other such properties of the one or more drugs. The long release drug system also includes an outer layer including a coating disposed on at least one of the first portion or the second portion of the capsule. Other embodiments of this aspect include corresponding structures capable of performing the actions described above.

Implementations of the long release drug capsule may include one or more of the following features. The buoyancy chamber may include a hollow chamber filled with gas, typically atmospheric air. In some examples, the buoyancy chamber may include a vacuum or partial vacuum. The buoyancy chamber may be filled with a porous material less dense than the surrounding gastric fluid, for example, a ten or twenty percent infill created with a three dimensional (3D) printer configured to produce the long release drug capsule. The buoyancy chamber may also include walls made of a porous material that is less dense than the surrounding gastric fluid and filled with gas. The porous material may have pores too small for the gastric fluid to enter into the buoyancy chamber. The long release drug capsule may include a third compartment having at least a second drug therein. At least one of a dimension, configuration, or position of the at least one opening may be adjusted based on a physical property of the at least one drug. The physical property of the at least one drug is at least one of viscosity, density, solubility, absorption rate, a probability of caking, a force of compaction of the at least one drug into the drug chamber, or hygroscopy. The capsule may further include at least a second opening through which the at least one drug is released. The capsule may be formed of a gastric fluid soluble material. The capsule may be formed of polyvinyl alcohol or hydroxypropyl methylcellulose, their analogues or combinations of other polymers. The outer layer may be an enteric coating. The at least one drug may be releasable through the at least one opening for a duration of at least three days before the capsule breaks down in the gastric fluid. The buoyancy chamber may include a fluid-tight chamber. The fluid-tight chamber may enclose a gas. The fluid-tight chamber may enclose a biocompatible foam that is soluble in gastric fluid. The buoyancy chamber may include material less dense than gastric fluid. The outer layer may be soluble in the gastric fluid. The outer layer may be soluble in the gastric fluid over a time period of at least three days. The capsule may be soluble in the gastric fluid and may be configured to break down in the gastric fluid after the outer layer has dissolved. The outer layer may include a third portion sealing the at least one opening of the capsule and a fourth portion covering at least one portion of the capsule, and where a rate of dissolution of the third portion of the outer layer may be greater than a rate of dissolution of the fourth portion. The outer layer may include a third portion sealing the at least one opening of the capsule and a fourth portion covering at least one portion of the capsule, and where a thickness of the fourth portion may be greater than a thickness of the third portion of the outer layer. The outer layer may cover an outer surface of the first portion and the second portion. The outer layer may coat the first interlocking feature and the second interlocking feature such that the first portion and the second portion are separable in response to the outer layer dissolving in the gastric fluid. The first interlocking feature and the second interlocking feature may interface with a friction fit. The first interlocking feature and the second interlocking feature may interface with a snap fit. The first interlocking feature and the second interlocking feature may be secured together with an adhesive or a securing compound. The opening may be on a first side of the capsule opposite the buoyancy chamber. The first portion and the second portion may be connected by a living hinge.

One general aspect includes a method including: determining a drug volume for packing a drug into a capsule for patient treatment as well as determining a buoyancy volume for the capsule to provide buoyancy to the capsule. The method also includes determining a capsule size based on the drug volume and the buoyancy volume. The method further includes determining a configuration of one or more openings based on at least one physical property of the drug or a drug release rate, where the configuration includes at least one of a number of the one or more openings or a size of at least one opening. The method further includes generating a capsule design having an air compartment, drug compartment, and at least one release outlet based on the drug volume, air compartment volume, the one or more openings, and the size of the one or more openings. The method also includes generating manufacturing instructions for a manufacturing system to produce the capsule based on the capsule design. Other embodiments of this aspect include corresponding computer systems, apparatus, and computer programs recorded on one or more computer storage devices, each configured to perform the actions of the methods.

Implementations of the method may include one or more of the following features. The air compartment volume may be between thirty-five and forty-five percent of a total volume of the capsule. The method may further include determining a thickness of an outer layer based at least in part on the drug release rate, and where the manufacturing instructions include instructions for applying the outer coating to the capsule. The drug volume may be determined based on a drug release rate. The drug volume may be determined based on a physical property of the drug such as at least one of viscosity, density, solubility, absorption rate, a probability of caking, a force of compaction of the at least one drug, reactivity, or hygroscopicity. The method may further include determining the drug release rate based on a patient treatment profile. Additionally, the method may include the presence of one or more excipients or non-active ingredients to be mixed together with the active ingredient for the purpose of bulk filling, reduced compaction, reduced aggregation of particles or improved dissolution profile. The drug volume may be determined based on a force of compaction and the drug release rate. Implementations of the described techniques may include hardware, a method or process, or computer software on a computer-accessible medium.

Another general aspect includes a method of manufacturing a capsule, including receiving manufacturing instructions based on a capsule design, the capsule design including a first portion having a buoyancy chamber and a first interlocking feature as well as a second portion including; a drug chamber, the drug chamber defining an opening providing a conduit between an exterior and an interior of the drug chamber. The capsule design also includes a second interlocking feature, the second interlocking feature configured to interface with the first interlocking feature to secure the first portion to the second portion and to fully enclose the drug chamber. The method of manufacturing also includes manufacturing, with a manufacturing system and based on the manufacturing instructions, a long release capsule formed of a gastric acid soluble material. Other embodiments of this aspect include corresponding computer systems, apparatus, and computer programs recorded on one or more computer storage devices, each configured to perform the actions of the methods.

Implementations of the method may include one or more of the following features. The manufacturing system may be at least one of: a three-dimensional printer using a filament of gastric acid soluble material, an injection molding system, a computer numerical control system, a casting system, an extrusion based forming system, a powder deposition based forming system, a selective laser based forming system, a stereolithography based forming system, or a vacuum forming system. Implementations of the described techniques may include hardware, a method or process, or computer software on a computer-accessible medium. An extension of the implementation may involve the method transfer of the 3D printed method to a capsule filling machine to scale up the volume for a specific composition of capsule material, fill material and active ingredient.

DETAILED DESCRIPTION

Examples are described herein in the context of extended and long release capsules for drug release in orally ingested pill capsules for patient treatment. Though the description is described with reference to drugs, the disclosure is intended to cover medicinal products, nutraceuticals, pharmaceuticals, supplements, and other consumable products. Though reference is made throughout to drugs released from a capsule, it is intended that the description covers any releasable agent released from the capsule. As used herein, a releasable agent refers to a drug, medicinal products, nutraceuticals, pharmaceuticals, supplements, and/or other consumable products that can be released and that, upon release, can affect properties within a bodily environment. Those of ordinary skill in the art will realize that the following description is illustrative only and is not intended to be in any way limiting. Reference will now be made in detail to implementations of examples as illustrated in the accompanying drawings. The same reference indicators will be used throughout the drawing and the following description to refer to the same or like items.

In the interest of clarity, not all of the routine features of the examples described herein are shown and described. It will, of course, be appreciated that in the development of any such actual implementation, numerous implementation-specific decisions need to be made in order to achieve the developer's specific goals, such as compliance with application- and business-related constraints, and that these specific goals will vary from one implementation to another and from one developer to another.

Typically, oral drug treatments are delivered in compressed tablets or encapsulated in gelatin capsules. In order to increase residence time in the stomach of a patient, approaches have included expanding, unfolding, adhering, and floating mechanisms which each have drawbacks and constraints, notably, that that residence times of greater than twenty-four hours are not typically known and some previous methods introduce elements which result in an increased risk of blockage of the stomach. As used herein, the drug or active ingredient may include pharmaceuticals, medicines, natural products, nutraceuticals, supplements, and complementary health products.

In comparison, the long release drug capsules described herein extends the release timeframe and profile of the active ingredient or drug treatment for a timescale longer than a typical physiological gastrointestinal transit time, which is typically around eight hours, for an orally ingested capsule. Long release drug, as used herein, is intended to cover mechanisms and delivery systems for drug delivery over a period of time extending beyond eight hours, including a period of time of between three and eight days, in some examples, the long release drug capsule may extend the period of time to up to and over thirty days. The capsules described herein may release over a timeframe of three to ten days or more. The capsules described below also include mechanisms for the capsule to break down or fragment into smaller pieces to be passed through the gastrointestinal tract after the drug has been fully released. The capsules may reduce variability in release kinetics, for example maintaining the release kinetics at zero order release kinetics, of the drug due to the capsule floating in the gastric fluid and thereby remain within the stomach of a patient by remaining afloat or neutrally buoyant within the stomach. Furthermore, the capsule provides improved patient acceptance due to the familiarity with capsule administration and ease of administration as compared to transdermal drug delivery systems or implantable systems which may provide drugs over a similar timeframe.

Embodiments of the present disclosure are directed to, among other things, a long release drug capsule having a buoyancy compartment and a drug compartment. The buoyancy compartment provides buoyancy to the capsule to increase the residence time for the capsule within the stomach. The drug compartment releases the active ingredient through one or more openings at a controlled rate. The capsule is formed of a material that breaks down in gastric fluid, such as polyvinyl alcohol or hydroxypropyl methylcellulose, their analogues or combinations of other polymers. The capsule may also be enteric in nature, a property from the composite of different polymers such as hydroxypropyl methylcellulose acetate succinate or polymethyl methacrylate, designed to resist or prevent dissolution or fragmenting of the capsule until the required time, which could be three to ten days, or more. The capsule may be partially or totally coated with an enteric coating to resist or prevent dissolution or fragmenting of the capsule until the enteric coating is dissipated. The drug may be released continuously or at intervals in a pulsed manner. When the drug is depleted, the enteric coating and the capsule break down into small fragments to be passed through the patient's gastrointestinal system.

Embodiments of the present disclosure are additionally directed to methods and systems for producing long release drug capsules. The methods may involve receiving treatment profile information and drug property information and designing a capsule based on the information that will have a long (several days) residence time within the stomach of a patient. The method includes determining the volume of the capsule, the volume of the buoyancy component as well as the release opening size, number, and placement and the addition of excipients to improve the compaction, dispersion, dissolution, and clumping properties of the drug. Systems for producing the capsules are also disclosed including custom manufacturing as well as mass production techniques including three-dimensional printing, vacuum forming, machining, injection molding, and the like.

Figure 1:
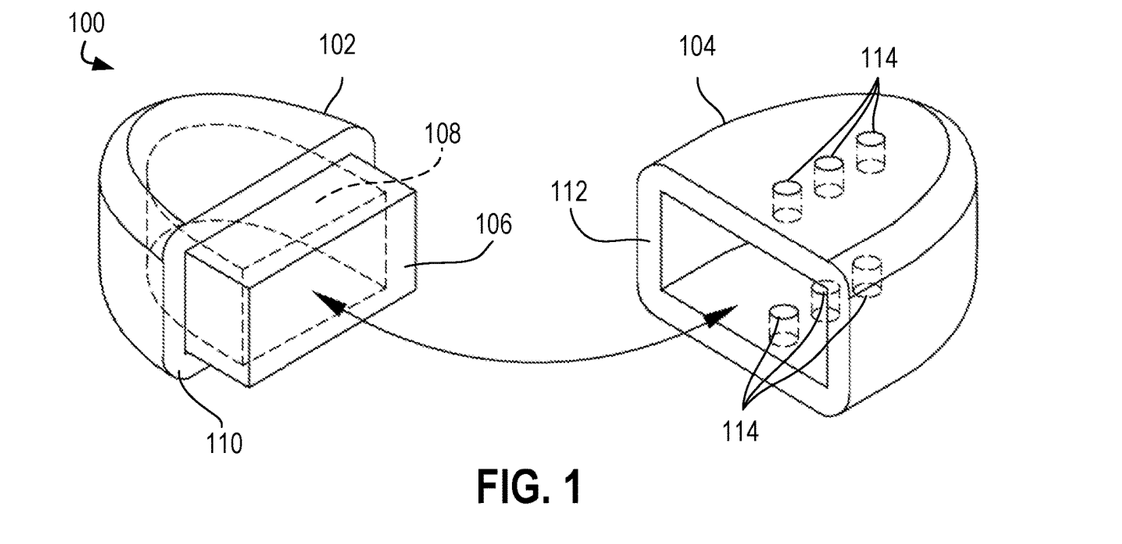
FIG. 1 depicts components of a capsule for long drug release having release openings on opposite sides of the capsule, according to at least some embodiments.

FIG. 1 depicts components of a capsule 100 for long drug release having release openings 114 on opposite sides of the capsule 100, according to at least some embodiments. The capsule 100 includes a first portion 102 and a second portion 104 which combine to form the capsule 100. Though the capsule 100 is pictured having a first portion 102 and a second portion 104, other configurations are anticipated which may include three or more components.

The first portion 102 may be formed of a Generally Regarded As Safe (GRAS) material based on definitions provided by the United States Food and Drug Administration (USFDA). The GRAS material may include biocompatible and biodegradable polymers and products. As an example, a polyvinyl alcohol (PVA) or any of its derivatives may be used to form the first portion 102. In some examples, the material may include polyethylene glycol (PEG), hydroxypropyl methylcellulose acetate succinate (HPMCAS), a mixture of polylactic acid with PEG, and other GRAS materials that are compatible with the manufacturing methods. The material should be susceptible to digestion and breakdown in gastric fluids of a patient. In some examples, the first portion 102 may be formed of many smaller components joined or fused together by a material such as PVA such that when the PVA breaks down the smaller components fragment away from each other into small pieces that may be easily passed by the patient.

The first portion 102 has a semi-elliptical solid shape such that when combined with the second portion 104 it forms an elliptical solid shape. The elliptical solid shape may be familiar to patients and easy to swallow when administered. Though pictured as an elliptical solid, other shapes are within the scope of the disclosure, such as cylindrical or other such geometric solids or variants thereof. Protruding from the semi-elliptical solid is an interface 106 shown as a rectangular solid which further defines the shape of the first component 102. An interface edge 110 defines the edge of the interface 106 and provides a surface perpendicular to the interface 106 to abut an adjacent surface of the second portion 104 when assembled together. The first portion 102 encloses a buoyancy chamber 108 that provides buoyancy to the capsule 100 when assembled to cause the capsule 100 to float within the gastric fluid of a patient's stomach.

The buoyancy chamber 108 may include a buoyancy material or may include a void that is fluid-tight, such as to retain a gas or keep out liquids. In some examples, the buoyancy chamber may be filled with air, nitrogen gas, oxygen, helium, or other such gases which provide buoyancy to the capsule 100. When the buoyancy chamber 100 is compromised at the end of treatment, the gas may be released or displaced by the gastric fluid causing the capsule to lose buoyancy and sink into the gastric fluid where it may be further broken down and passed from the patient. In some examples, the buoyancy chamber may include a floatation element such as a foam or other such structure which is less dense than gastric fluid and result in floatation of the capsule 100. As an example, a foam of PVA may be included in or onto the first portion 102. The foam may slowly degrade due to the interaction with the gastric fluid and ultimately lose buoyancy at the end of treatment. In such examples, the buoyancy chamber 108 need not be an enclosed chamber but may include a buoyancy device connected to the first portion 102. In some examples, additional buoyancy chambers 108 may be added to the capsule 100, for example with a buoyancy chamber 108 on each of the first portion 102 and the second portion 104 with a chamber for the active ingredient in between or adjacent the buoyancy chambers 108. It will be appreciated that other geometry and layouts of the components of capsule 100 are intended to be encompassed by the present description and will be understood by those with skill in the art.

The second portion 104 may be formed of the same material as the first portion 102 or in some examples may be formed of a different material. For example, the first portion may be formed of PVA which degrades or dissolves in gastric fluid while the second portion 104 may be formed of a non-gastric-fluid-soluble material. When the buoyancy chamber 108 is compromised, the capsule 100 may sink though the second portion 104 may be intact. In some examples, the first portion 102 and the second portion 104 are formed of the same material that degrades within the gastric fluid. The second portion 104 may include multiple chambers for holding multiple different drugs within the capsule 100. In some examples, the second portion 104 may be split lengthwise by a divider with openings 114 providing access into each of the divided chambers. In some examples, the multiple drugs may be mixed together or may be compacted in the second portion 104 in stratified layers. For example, a first drug may be packed into the second portion 104 such that the opening 114 nearest the end of the second portion 104 enables release of the first drug while a second drug is packed on top of or adjacent to the first drug, with a second opening 114 enabling release of the second drug.

The second portion 104 also has a semi-elliptical solid shape but is open to the environment through openings 114 and interface 112. Interface 112 provides a connection to secure the interface 106 and interface edge 110 to form the capsule 100. The openings 114 are provided in the top and bottom sides of the second portion 114 and provide a drug release conduit into the gastric fluid of the patient. The openings 114 are shown in a line but may be arranged in other orientations or configurations. Additionally, though three openings 114 are shown on each side, there may be more or less openings 114 depending on a drug release rate, with more openings 114 providing greater access and faster drug release rates. There may also be openings 114 on the edge of the second portion 104, such as at the edge opposite interface 112. The openings 114 are shown as circular openings, though other shapes are intended including geometric shapes and irregular shapes.

The second portion 104 may be filled or packed with a drug for treatment of a patient. The drug may be a powder, solid, liquid, or any other suitable form. The drug may be compacted into the second portion 104 to ensure the first portion 102 and the second portion 104 fit together as well as to alter a drug release rate through the openings 114. For example, a higher force of compaction results in a lower release rate as the gastric fluid cannot penetrate the tightly packed drug and can only interface with portions of the packed drug adjacent opening 114.

The interface 106 and the interface 112 couple together with a friction fit to form capsule 100. In some examples the interface 106 may have a securing feature such as a snap element or a deformation element to retain the first portion 102 and the second portion 104 together. In some examples the interface 106 may also include an adhesive or other material to provide additional holding force between the first portion 102 and the second portion 104.

When assembled, capsule 100 has an elliptical solid shape with the buoyancy chamber 108 at one end and the openings 114 at an opposite end of the elliptical shape. When in a fluid, such as gastric fluid, the buoyancy chamber 108 will cause the end of the capsule 100 having the first portion 102 to float while the second portion 104 is submerged. The openings 114 being submerged allows drug release into the gastric fluid.

In some examples, the capsule 100 may have one or more dimensions, such as a length, width, or diameter, larger than a dimension of the intestine. The dimension larger than the intestine may help ensure the capsule 100 is not passed from the stomach until it fragments into multiple pieces. Additionally, the capsule 100 may be sized or have a dimension smaller than the esophagus so it can be easily swallowed by a patient. Capsule 100 may have a length of a few millimeters, such as eight millimeters, up to a several centimeters, such as two centimeters. Similarly, the width and thickness may be similarly within a range of a few millimeters to several centimeters. The width may be in a range of three millimeters to fifteen millimeters and the thickness may be in a range of three millimeters to fifteen millimeters or alternatively in a range of five millimeters to ten millimeters each. The openings 114 may have a diameter or effective diameter in a range of one to two millimeters.

Capsule 100 may be coated with an enteric coating that prevents dissolution or disintegration of the capsule 100 within the gastric fluid until the enteric coating is disintegrated. In some examples, the capsule 100 may itself be formed of an enteric composite that breaks down slowly, over a period of three to ten days, before the capsule 100 disintegrates or breaks down. The enteric coating may be any suitable material that is resistant to the digestive action of gastric fluids. The enteric coating may be applied in a thickness depending on the residence time within the stomach. For example, for a capsule 100 with an intended residence time of eight to ten days the coating will be thicker than a capsule 100 with an intended residence time of three to four days. The enteric coating may include EUDRAGIT™ L100 or a solution including the same as an example. In some examples, the enteric coating may include hydroxypropyl methylcellulose acetate succinate (HPMCAS), hydroxypropyl methylcellulose phthalate (HPMCP), cellulose acetate phthalate (CAP), waxes, fatty acids, EUDRAGIT™ L100-5.5, or any other enteric polymer used in coating capsules for ingestion. The coating may be selective applied over the capsule 100. In some examples, the capsule 100 may be formed of a gastric-resistant material with only a connection at interface 106 formed of a gastric-soluble material. The coating may be applied over the gastric-soluble material such that when the coating is dissolved or degraded by the gastric fluid, the gastric-soluble material may break down allowing the capsule 100 to fragment into at least two pieces and pass. In some examples, the coating may be applied in a thin layer over the opening 114 such that the coating over the opening 114 degrades away rapidly when ingested and enables release of the drug. In some examples a first material may be applied over a portion of the capsule 100 with a second material applied as a coating over the opening 114, the second material breaking down in gastric fluid more readily than the first to enable release of the drug.

Figure 2:
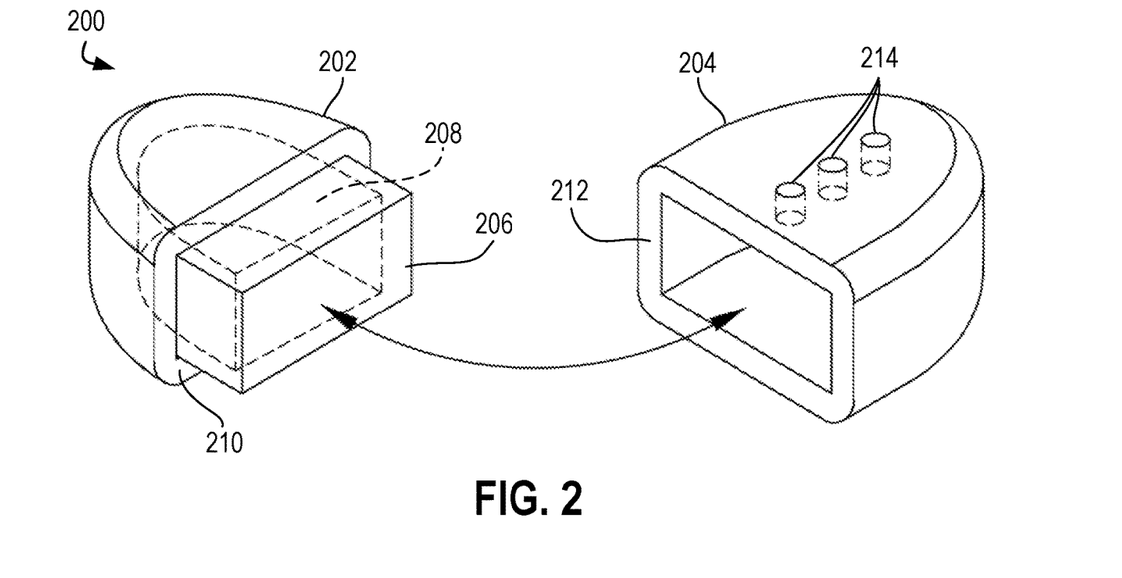
FIG. 2 depicts components of a capsule for long drug release having release openings on one side of the capsule, according to at least some embodiments.

FIG. 2 depicts components of a capsule 200 for long drug release having release openings 214 on one side of the capsule 200, according to at least some embodiments. The capsule 200 may include a first component 202 having a buoyancy chamber 208, interface 206, and interface edge 210 similar to the first component 102, buoyancy chamber 108, interface 106, and interface edge 110 of FIG. 1. Likewise, the second portion 204 may be similar to the second portion 104 of FIG. 1 with the exception of the openings 214. The openings 214 are arranged only one side of the capsule 200 and by reducing the number of openings 214 as compared with capsule 100, the release rate of the drug may be reduced accordingly.

Figure 3:
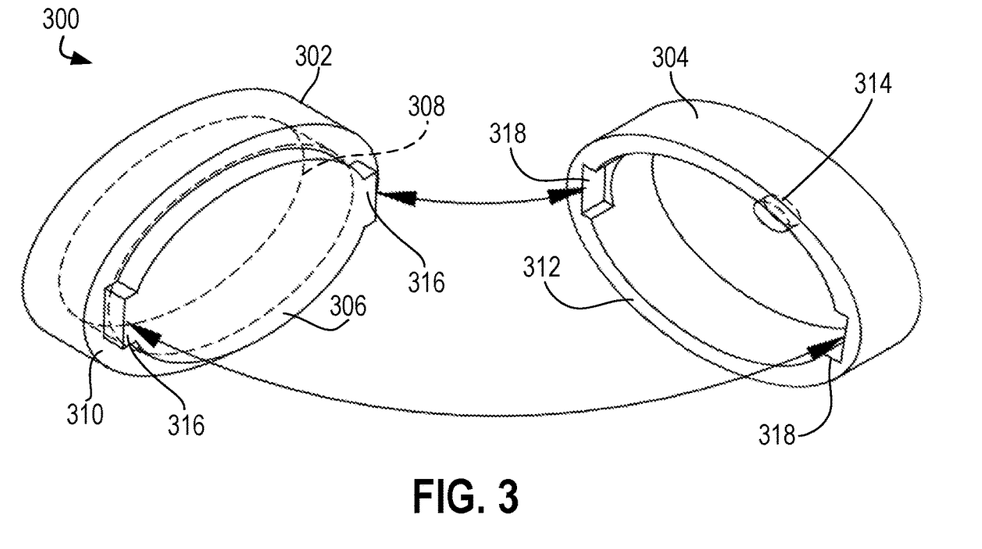
FIG. 3 depicts components of a capsule for long drug release having snap closures to secure the components together, according to at least some embodiments.

FIG. 3 depicts components of a capsule 300 for long drug release having snap closures 316 to secure the components together, according to at least some embodiments. The capsule 300 includes a first portion 302 and a second portion 304. The first portion 302 includes an interface 316, interface edge 310, and buoyancy chamber 308 similar to those described above with respect to FIG. 1. The first portion 302 and the second portion 304 each have an elliptical solid shape that join together to form capsule 300 which may have the same elliptical footprint as capsule 100 however the first portion 302 and the second portion 304 are divided along the length of the capsule 300 rather than across a middle portion as in FIGS. 1 and 2 above.

At the edges of the interface 306 are snap closures 316. Snap closures 316 may include flexible elements or filaments that deform when the first portion 302 and the second portion 304 are coupled together and retain the first portion 302 and the second portion 304 together into capsule 300. The snap closures 316 may also provide a keyed portion to align the first portion 302 and the second portion 304 to fit snugly and completely together. In some examples, the snap closure 316 may provide additional surface area on which an adhesive may be applied to secure the first portion 302 and the second portion 304 together. The adhesive must be a food-grade adhesive to provide the securing force to keep the snap closures 316 together.

The second portion 304 may include grooves 318 to receive the snap closures 316. In some examples, the grooves 318 may include a ridge or a lip which causes the snap closure 316 to deform when pressed together, the deformation engaging a retaining hook of the snap closure 316 onto the ridge to retain the first portion 302 and the second portion 304 together.

The second portion 304 includes a single opening 314 opposite the interface 312 which abuts the interface edge 310 when assembled. As described above, there may be more than one opening 314 to increase the release rate of the drug.

When assembled, the capsule 300 floats with the first portion 302 above the second portion 304 such that the opening 314 is submerged and enables the release of drugs through the opening 314.

Figure 4:
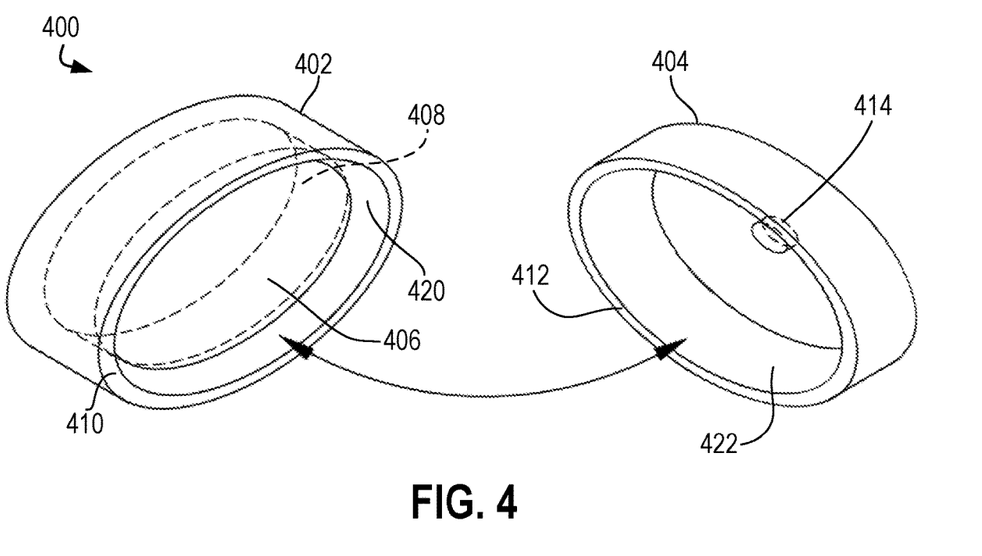
FIG. 4 depicts components of a capsule for long drug release having a friction fit to secure the components together, according to at least some embodiments.

FIG. 4 depicts components of a capsule 400 for long drug release having a friction fit to secure the components together, according to at least some embodiments. The capsule 400 includes a first portion 402 and a second portion 404 similar to the first portion 302 and the second portion 304 of FIG. 3 and including or enclosing buoyancy chamber 408 and opening 414. The components of capsule 400 are coupled together with a friction fit. In particular, surface 406 and surface 420 receive interface 412 and surface 422. Interface edge 410 may further engage with the second portion 404 and provide a surface for contact and adhesion. The second portion 404 nests within the first portion 402 with surface 420 interfacing in a frictional engagement with surface 422 to secure the first portion 402 to the second portion 404. Surface 420 or surface 422 may have an adhesive or other material applied thereto that secures the frictional fit as described above with respect to FIG. 3. In some examples, the adhesive or other material may be a material that is degradable by gastric fluid, such that the material adhering the first portion 402 to the second portion 404 degrades in gastric fluid to release the capsule 400 into smaller components after the drug is released. For example, after an outer coating of capsule 400 has degraded or dissolved in the gastric fluid, the material adhering the first portion 402 and the second portion 404 may degrade quickly in gastric fluid to release the capsule for passing through the stomach.

In some examples, the capsule 400 may be formed of one or more materials, such as a composite of materials. In some examples, the first portion 402 and the second portion 404 may each be formed of different materials while in some examples each of the first portion 402 and the second portion 404 may be formed of multiple materials in different layers. In one particular example, the first portion 402 and the second portion 404 may each be formed of combinations of polylactic acid (PLA) and a composite material comprising hypromellose acetate succinate (HPMCAS), polyvinyl alcohol (PVA), and PLA. For instance, the surface 406 and interface edge 410 may each be formed of PLA while the remainder of the first portion 402, such as the walls surrounding and defining the buoyancy chamber 408 may be formed of the composite material. Similarly, in the particular example, the second portion may be formed of a combination of the materials.

In some examples, other materials may be selected for one or more portions of the capsule 400 for various purposes and/or properties such as swelling characteristics, manufacturability, and other such properties. For instance, a portion of the capsule surrounding the opening 414 may be formed of a non-swellable material (e.g., PLA) such that the size of the opening is consistent and controlled and not altered as the material begins to swell. Different walls or surfaces of the capsule 400 may be formed of a composite material based on a selected or desired dissolution rate in gastric fluid, for example such that the capsule 400 breaks down entirely at around the same time or shortly after the active ingredient is expected to be released.

FIGS. 2-4, described above, are provided for illustrative purposes only. There may be other securing means and mechanisms than those described above as well as other shapes and configurations of the capsule 100 with the first portion 102 and the second portion 104. There may be additional components, alternative planes dividing the portions, and adhesives, coatings, or other means of securing the portions of the capsule 100 together.

FIGS. 5A-5E depict exemplary stages of drug release from a capsule 500 in a stomach 502 of a patient over a duration of time, according to at least some embodiments. The capsule 500 includes a drug 510 for a particular treatment of the patient that was previously ingested by the patient. The stomach 502 and capsule 500 are shown for illustration purposes and not necessarily to scale. The capsule 500 includes be a buoyancy chamber 508 and an opening 514 similar to those shown and described above with a coating 504 surrounding the capsule 500. The capsule 500 floats in the gastric fluid 506 with the buoyancy chamber 508 above the drug 510 and the opening 514 submerged in the gastric fluid 506.

Figure 5A:
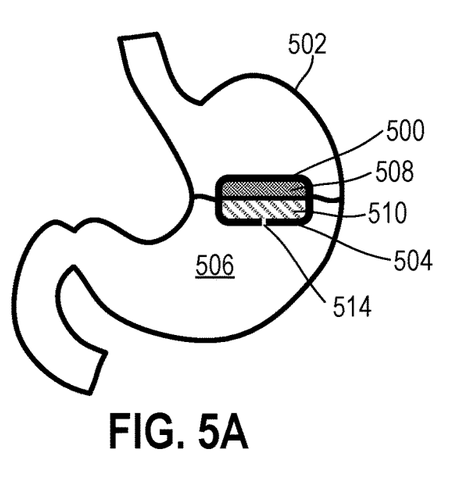
FIGS. 5A, 5B, 5C, 5D, and 5E depict exemplary stages of drug release in a stomach of a patient over a long duration of time, according to at least some embodiments.

FIG. 5A depicts the capsule 500 shortly after being ingested by the patient. The coating 504 is mostly undisturbed and intact, with the exception of the opening 514 being uncovered from ingestion of the capsule 500, to enable the zero-order release kinetics from at or near the moment of ingestion. In some examples, the opening 514 may be coated with a thin coating similar to coating 504 or more readily soluble that breaks down rapidly once ingested.

Figure 5B:
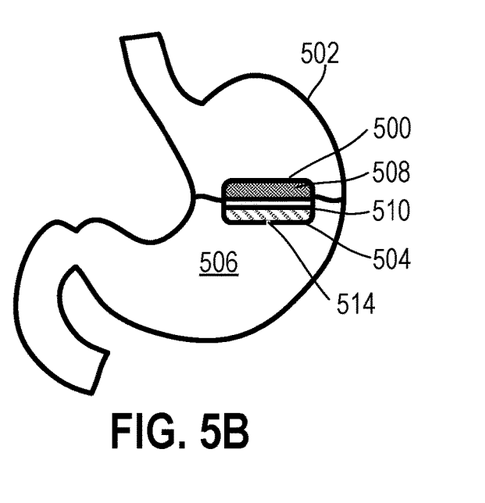

FIG. 5B depicts the capsule 500 after some period of time has passed, such as one to three days. The coating 504 is thinner, with the coating 504 being slowly dissolved or disintegrated by the gastric fluid 506. The drug 510 has reduced, as it is dispersed into the gastric fluid 506 through opening 514 for absorption into the patient.

Figure 5C:
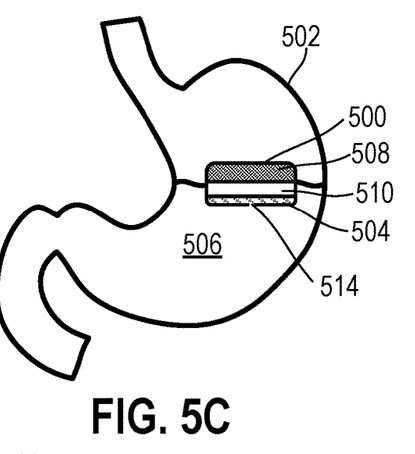

FIG. 5C depicts the capsule 500 after additional time has passed from FIG. 5B, such as an additional one to three days. The coating 504 is thinner still, with the coating 504 being slowly dissolved or disintegrated by the gastric fluid 506. The drug 510 has reduced further, as it is dispersed into the gastric fluid 506 through opening 514 for absorption into the patient.

Figure 5D:
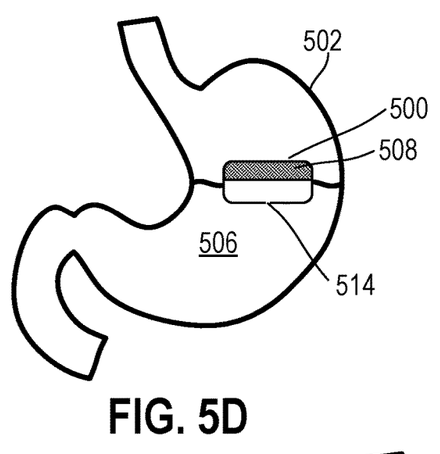

FIG. 5D depicts the capsule 500 after additional time has passed, such as one to three further days. The coating 504 is depleted and no longer covering the capsule 500. The drug 510 has likewise depleted. The gastric fluid 506 is in direct contact with the capsule 500 as well as the wall of the buoyancy chamber 508. The capsule 500 begins to break down in contact with the gastric fluid 506.

Figure 5E:
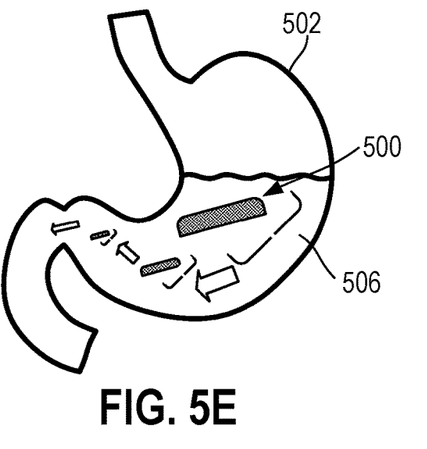

FIG. 5E depicts the capsule 500 breaking into components and being passed out of the stomach 506. The capsule 500 fragments into multiple pieces which are smaller and more easily passed. Additionally, the buoyancy chamber 508 is breached or fragmented such that the gas is released and it is no longer buoyant and sinks into the gastric fluid. Though the capsule 500 is shown breaking into two pieces, in some examples the capsule 500 will break down into more than two pieces and may dissolve away entirely in direct contact with the gastric fluid.

Though the capsule 500 is shown floating on top of the gastric fluid 506, the capsule 500 need not stay afloat but may sink below the surface of the gastric fluid 506. In some examples the capsule 500 may sink to a predetermined depth based on the buoyancy of the capsule 500 such as the middle of the stomach, near the upper surface, or near the bottom of the stomach. The depth of the capsule 500 may likewise change over time, for example with the capsule 500 slowly sinking from the surface to the bottom of the gastric fluid 506 over the course of drug release in response to a change in buoyancy as the drug is released and as the capsule 500 begins to degrade. In some examples, the buoyancy chamber may include a foam that degrades over time, reducing the buoyancy of the capsule 500 progressively as time moves forward. Additionally, the composition of the gastric fluid 506 may change over time, for example based on the eating habits of the patient, which may cause the capsule 500 to sink or rise to different depths within the stomach.

FIGS. 6A-6D depict charts of cumulative drug release over time for various capsule designs, according to at least some embodiments. The drugs were released from capsules subjected to a United States Pharmacopeia (USP) dissolution test.

Figure 6A:
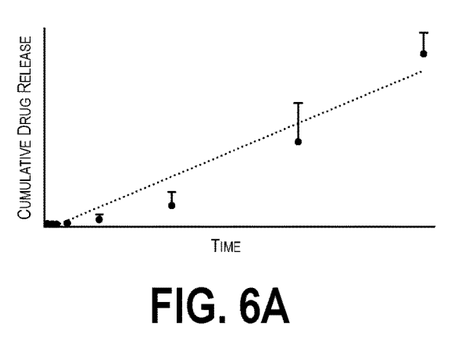
FIGS. 6A, 6B, 6C, and 6D depict charts of cumulative drug release over time for various capsule designs, according to at least some embodiments.

FIG. 6A depicts a drug release chart for the capsule 100 having openings 114 on both sides of the capsule 100 over a period of three days total. As shown in the figure, the cumulative drug release increases in a manner that may be approximated by the linear trend line until all of the drug is released. The release from capsule 100 was of zero-order release kinetics over a period of three days.

Figure 6B:
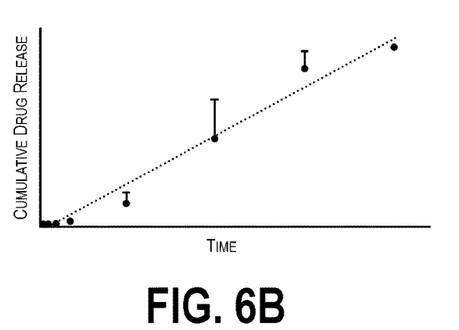

FIG. 6B depicts a drug release chart for the capsule 200 having openings 214 on only one side of the capsule 200 over a period of four days. The only difference between the capsule 100 and capsule 200 is the number of openings, with twice as many openings on capsule 100. The drug release was similarly of zero-order kinetics, but over a period of four days rather than three for capsule 100 until the drug was completely released.

Figure 6C:
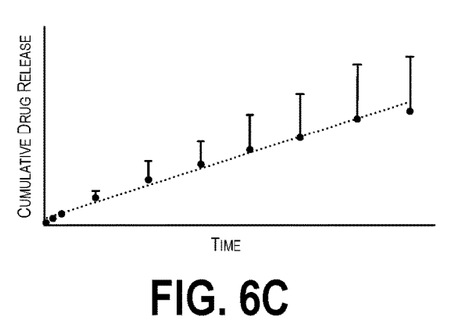
Figure 6D:
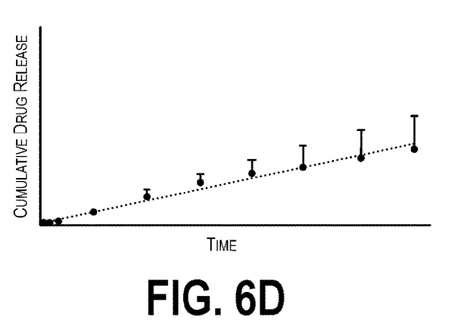

FIGS. 6C and 6D depict drug release charts for the capsule 400 in the same dissolution test over a period of seven days. The capsule 400 of FIG. 6C featured an additional opening that enabled release of the drug at a faster rate than the capsule 400 of FIG. 6D. As shown in FIGS. 6C and 6D, the capsule 400 was capable of maintaining zero-order drug release kinematics over a period of greater than seven days.

Figure 7:
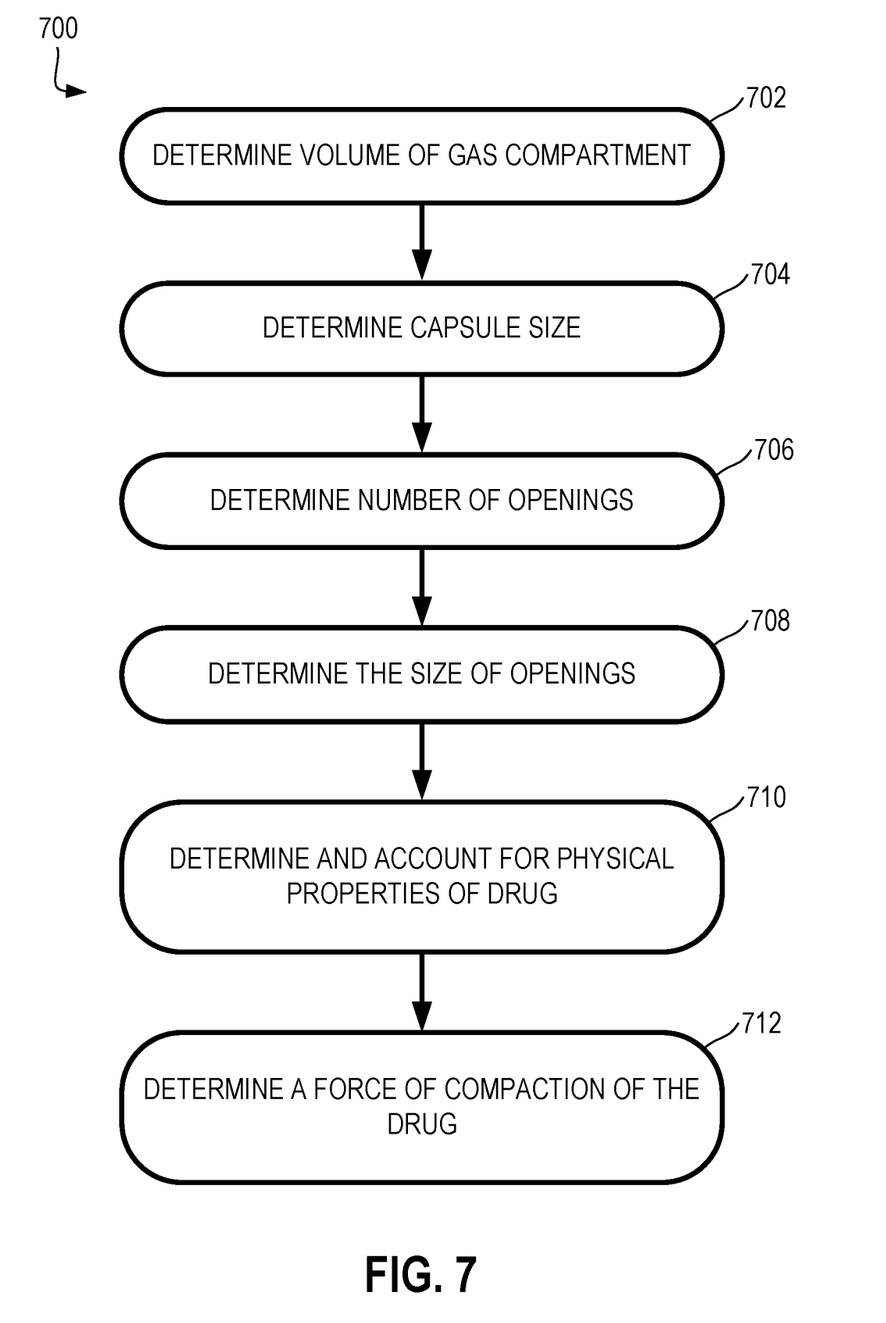
FIG. 7 depicts a simplified flowchart depicting a process for determining a capsule design for long drug release, according to at least some embodiments.
Figure 8:
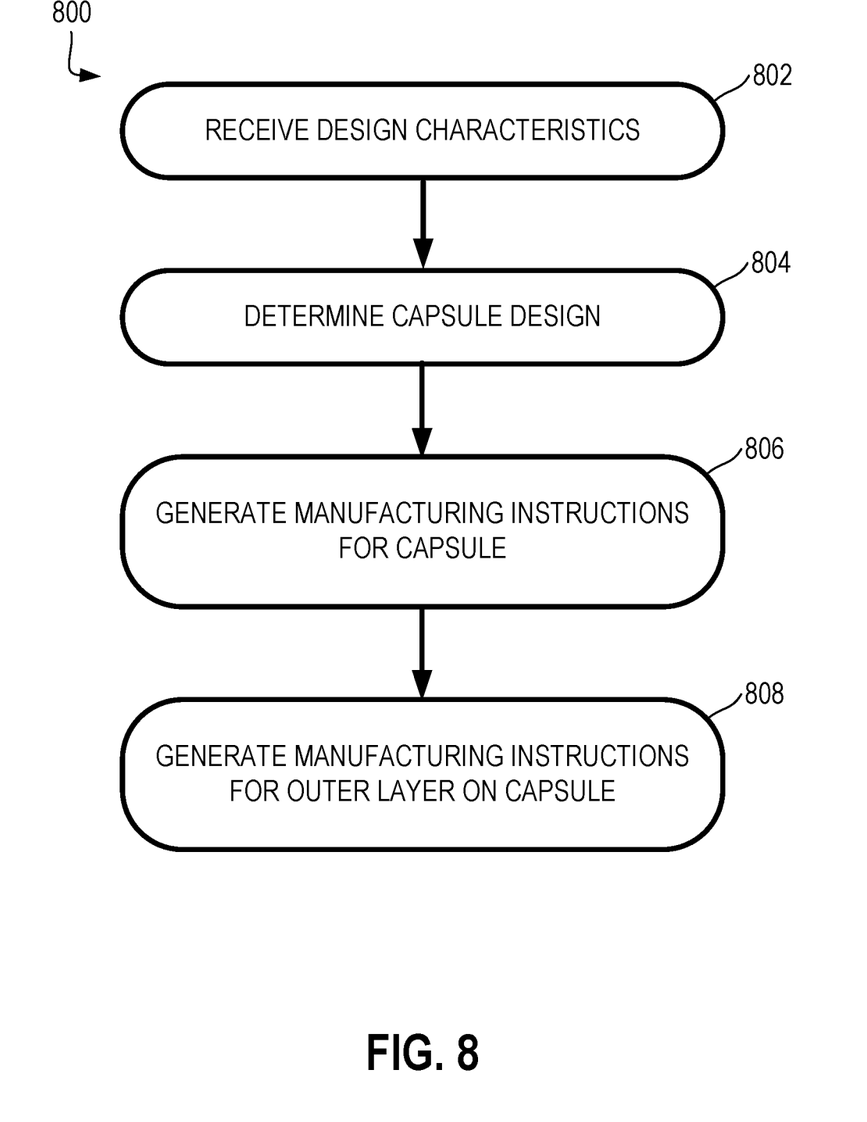
FIG. 8 depicts a simplified flowchart depicting a process for generating manufacturing instructions for a capsule for long drug release, according to at least some embodiments.

FIGS. 7 and 8 illustrate example flow diagrams showing processes 700 and 800 according to at least a few examples. These processes, and any other processes described herein, are illustrated as logical flow diagrams, each operation of which represents a sequence of operations that can be implemented by a user, in hardware, computer instructions, or a combination thereof. Though presented as sequential logical flow diagrams, some or all of the operations may be completed in different orders or simultaneously. The processes 700 and 800 may also be performed iteratively or only a single time.

FIG. 7 depicts a simplified flowchart depicting a process 700 for determining a capsule design for long drug release, according to at least some embodiments. The process 700 begins at 702 with determining a volume of a gas compartment. A larger air compartment provides greater buoyancy to the capsule and ensures that the capsule floats in the gastric fluid, even before, during, or after meals. However, a large air compartment also restricts the amount of drug that may be included in the capsule. The capsule may be limited in size by the limits of a patient to ingest safely thereby limiting the volume to be divided between the buoyancy chamber and the drug. In some examples a volume of the air chamber may be approximately forty percent of the total volume of the capsule to balance the buoyancy against the volume of drug supplied, sometimes referred to as a packing volume, indicative of the volume of the long release drug within the capsule. In some examples, the volume may be in a range of zero to one hundred percent. In some examples, the volume may be less than fifty percent while in some examples, the volume may be greater than fifty percent. The volume may be determined as a percentage of the total volume or may be expressed as a volume based on a desired buoyancy force, such as a sufficient volume of gas to cause the capsule to be buoyant in gastric fluid based on the overall or average density of the capsule versus the density of gastric fluid. Though a gas chamber is described above, the method is intended to encompass determination of a volume or buoyancy of a non-gas buoyancy device such as the foam described above.

Block 704 includes determining a capsule size. The larger a capsule is, the greater volume may be contained therein however it may be more difficult to ingest. In some examples, the capsule may be approximately sixteen millimeters by ten millimeters by six millimeters. In some examples, the dimensions of the capsule may vary from one to two millimeters to thirty millimeters in any particular dimension. The capsule size may be determined based on a patient, for example with an adult patient receiving a larger capsule size than a child patient. Age of the patient or other patient characteristics or other factors may also impact the determination of capsule size.

At block 706 and block 708, the process 700 includes determining a number of openings in the capsule as well as the size of the openings. The number of openings and the size of the openings each affects the release rate of the drug. A greater number of release openings results in a greater release rate and a larger opening size similarly results in a faster release rate. In some examples, the number of openings may be in a range of one to several thousand microscopic holes. In some examples, the openings may have a diameter or effective diameter in a range of one to two millimeters. In some examples, the openings may range in diameter from a fraction of a millimeter to several millimeters. In addition, block 706 and block 708 may include determining a shape of the openings, such as a circular opening, a square opening, or other such shapes.

At block 710, the process 700 includes determining and accounting for physical properties of the drug, especially in determining a release rate of the drug. The physical properties of the drug will affect the release rate of the drug. Some examples of relevant physical properties include viscosity, density, solubility, absorption rate, a probability of caking, or hygroscopicity. As an example a drug having a higher solubility will release at a higher rate than a drug having a lower solubility. Similarly, less viscous, less dense drugs will have higher release rates than more viscous more dense drugs. These physical properties may be accounted for in determining the size and number of openings as well as the volume of the capsule and volume of the gas chamber described above or improved by the addition of excipients mixed with the drug to alter the dispersion, solubility, clumping, or other properties of the drug. For example, less viscous drugs are likely to seep quickly through large openings, such as openings of around two millimeters but may be slowed by the use of openings less than one millimeter in diameter.

At block 712, the process includes determining the force of compaction of the drug into the capsule. The force of compaction will determine the amount of drug that can be packed as well as the density of the capsule and have an impact on the rate of release. Additionally, the force of compaction may cause the drug to release slower, for example when the force is large and the caking is probable.

As the factors going into the design of a capsule may be interconnected, the factors may be determined simultaneously or an iterative process may be used to finalize a capsule design, for example by beginning with a patient treatment profile defining a drug release rate and time period for treatment and a black box or sample capsule design and adjusting the parameters described above to arrive at the desired release rate, residence time, and capsule size.

FIG. 8 depicts a simplified flowchart depicting a process 800 for generating manufacturing instructions for a capsule for long drug release, according to at least some embodiments. The process 800 may be performed by a computing device, such as the computing device described below. The process 800 begins at block 802 by receiving design characteristics. The design characteristics may include any or all of the factors and features described and determined with respect to process 700 described above such as the drug density, capsule volume, and other such factors.

At block 804, the computing device may determine a capsule design based on the design characteristics received at block 802. As described above with respect to process 700, the capsule design may be determined using an iterative process. In some examples, the capsule may be designed parametrically or based on a set of variables, with the variables interconnected based on relationships between the characteristics, such as an increase in the number of openings increasing the release rate. The capsule design may be determined as a list of parameters such as volume, gas volume, drug volume, number of openings, and opening size, or, in some examples, the computing device may output a three-dimensional model of the capsule design.

At block 806, the computing device may generate manufacturing instructions for manufacturing the capsule based on the capsule design using a manufacturing device. The manufacturing device may be any suitable manufacturing device, such as a three-dimensional printer or other such manufacturing device described below with respect to FIG. 9. The manufacturing instructions may be conveyed to a manufacturing apparatus for manufacturing of the capsule.

At block 808, the computing device may generate manufacturing instructions for coating an outer layer on the capsule. The outer layer may be selected and the thickness as well as the placement of the outer layer determined based on the design characteristics described above. In addition, the selective application of the outer layer may be included in the manufacturing instructions. Additionally, multiple layers of different outer layers may be applied to the capsule based on desired characteristics, such as residence time in gastric fluid. The manufacturing instructions may then be conveyed to a coating machine for coating of the capsule generated at block 808.

Figure 9:
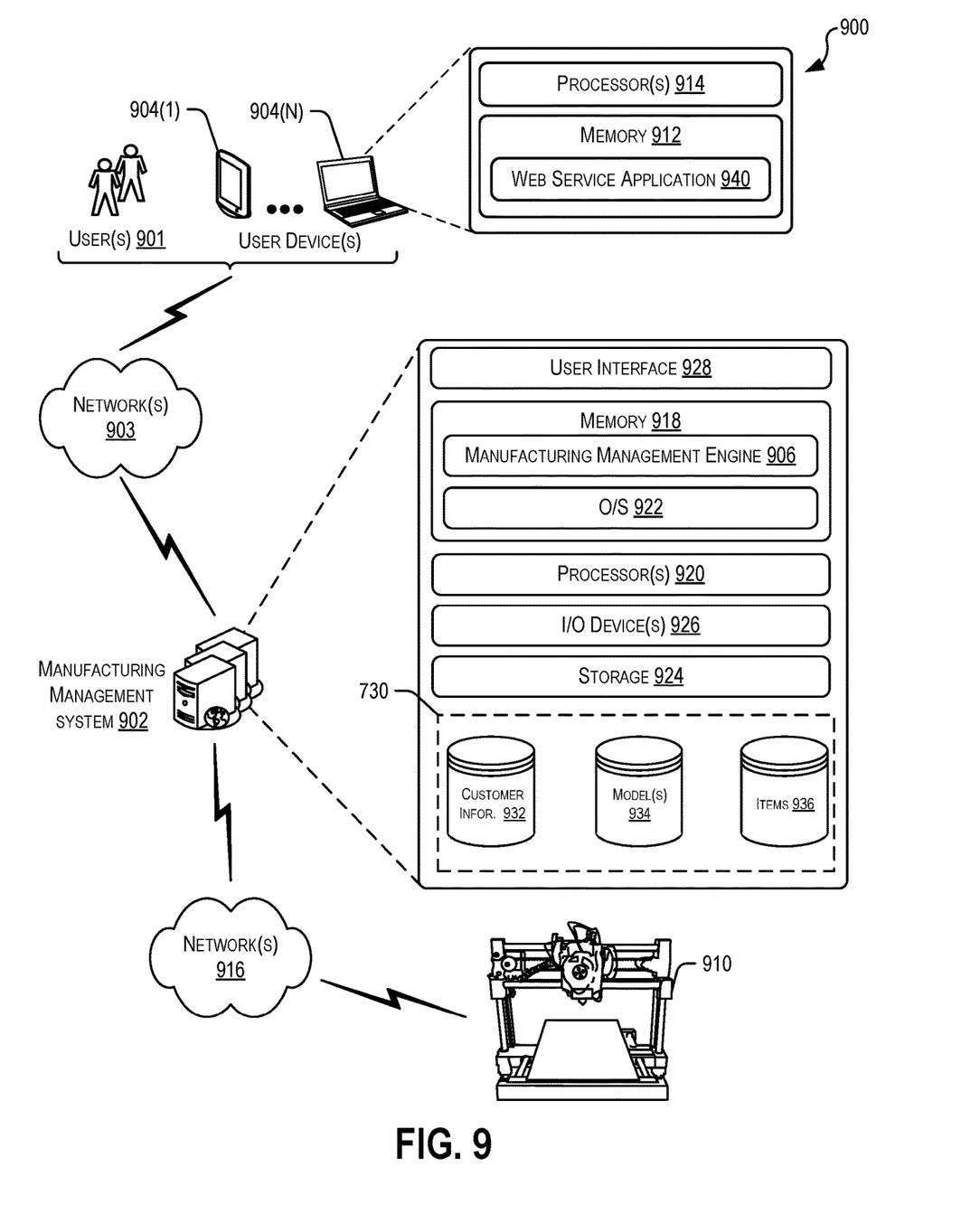
FIG. 9 depicts an example schematic architecture for implementing techniques relating to generating instructions for manufacturing a capsule for long drug release, according to at least some embodiments.

FIG. 9 depicts an example schematic architecture 900 for implementing techniques relating to generating instructions for manufacturing a capsule for long drug release, according to at least some embodiments. The architecture 900 may include a manufacturing management system 902 in communication with one or more user devices 904(1)-904(N) (hereinafter, "the user device 904") via one or more networks 903 (hereinafter, "the network 903"). The manufacturing management system 902 communicates with a user device 904 and a production apparatus 910. Using any suitable software, application, etc. running on the user device 904 or otherwise, a user 901 may provide input to the manufacturing management system 902 to design a capsule as described above. The user device 904 may be operable by one or more users 901 (hereinafter, "the user 901") to interact with the manufacturing management system 902. The network 903 may include any one or a combination of many different types of networks, such as cable networks, the Internet, wireless networks, cellular networks, and other private and/or public networks. The user 901 may be any suitable user including, for example, customers of an electronic marketplace that are associated with the manufacturing management system 902, or any other suitable user.

The production apparatus 910 may include any suitable additive and/or subtractive manufacturing apparatus configured to perform any suitable manufacturing process. For example, the production apparatus 910 is illustrated as an extrusion deposition type of apparatus. Other suitable manufacturing apparatuses may be configured to perform processes including, for example, a screen printing machine, a digital ink jet printing machine, a flexo printing machine, a ultra violet (UV) lithography printing machine, laser printing machine, a pad printing machine, an electron beam freeform fabrication machine, an electron-beam melting machine, a selective heat sintering machine, a selective laser sintering machine, a plaster-based three-dimensional printing machine, a laminated object manufacturing machine, a stereolithography machine, a digital light processing machine, and/or any other suitable additive and/or subtractive production machine. Additional methods and apparatuses for manufacturing may be used in some examples including vacuum forming, thermoplastic forming, casting, injection molding, molding, and the like.

The architecture 900 may also include the production apparatus 910 in communication with at least the manufacturing management system 902 via a secondary network 916. The secondary network 916 may include any one or a combination of many different types of networks as described elsewhere herein Turning now to the details of the user device 904, the user device 904 may be any suitable type of computing device such as, but not limited to, a tablet, a mobile phone, a smart phone, a personal digital assistant (PDA), a laptop computer, a desktop computer, a cloud computing device, or any other suitable device capable of communicating with the manufacturing management system 902 via the network 903 or any other suitable network. For example, the user device 904(1) is illustrated as an example of a smart phone, while the user device 904(N) is illustrated as an example of a laptop computer.

The user device 904 may include a web service application 940 within memory 912. Within the memory 912 of the user device 904 may be stored program instructions that are loadable and executable on processor(s) 914, as well as data generated during the execution of these programs. Depending on the configuration and type of user device 904, the memory 912 may be volatile (such as random access memory (RAM)) and/or non-volatile (such as read-only memory (ROM), flash memory, etc.). The web service application 940, stored in the memory 912, may allow the user 901 to interact with the manufacturing management system 902 via the network 903. Such interactions may include, for example, interacting with user interfaces provided by the manufacturing management system 902, selecting capsule designs, customizing capsule designs, and placing orders for capsule designs, performing any other interaction described herein or relating to obtaining capsules, and any other suitable client-server interactions. The manufacturing management system 902, whether associated with the electronic marketplace or not, may host the web service application 940.

The manufacturing management system 902 may include one or more service provider computers, and may host web service applications. These servers may be configured to host a website (or combination of websites) viewable on the user device 904 (e.g., via the web service application 940). The user 901 may access the website to view items (e.g., capsules) that can be ordered from the manufacturing management system 902 (or an electronic marketplace associated with the manufacturing management system 902). These may be presentable to the user 901 via the web service applications.

The manufacturing management system 902 may include at least one memory 918 and one or more processing units (or processor(s)) 920. The processor 920 may be implemented as appropriate in hardware, computer-executable instructions, software, firmware, or combinations thereof. Computer-executable instruction, software, or firmware implementations of the processor 920 may include computer-executable or machine-executable instructions written in any suitable programming language to perform the various functions described. The memory 918 may include more than one memory and may be distributed throughout the manufacturing management system 902. The memory 918 may store program instructions that are loadable and executable on the processor(s) 920, as well as data generated during the execution of these programs. Depending on the configuration and type of memory including the manufacturing management system 902, the memory 918 may be volatile (such as random access memory (RAM)) and/or non-volatile (such as read-only memory (ROM), flash memory, or other memory). The memory 918 may include an operating system 922 and one or more application programs, modules, or services for implementing the techniques described herein including at least a manufacturing management engine 906. In some examples, the production apparatus 910 is configured to perform the techniques described herein with reference to the manufacturing management system 902, including the manufacturing management engine 906.

The manufacturing management system 902 may also include additional storage 924, which may be removable storage and/or non-removable storage including, but not limited to, magnetic storage, optical disks, and/or tape storage as well as private or public cloud networks. The disk drives and their associated computer-readable media may provide non-volatile storage of computer-readable instructions, data structures, program modules, and other data for the computing devices. The additional storage 924, both removable and non-removable, are examples of computer-readable storage media. For example, computer-readable storage media may include volatile or non-volatile, removable or non-removable media implemented in any suitable method or technology for storage of information such as computer-readable instructions, data structures, program modules, or other data. As used herein, modules, engines, and components, may refer to programming modules executed by computing systems (e.g., processors) that are part of the manufacturing management system 902, the user device 904, and/or the production apparatus 910.

The manufacturing management system 902 may also include input/output (I/O) device(s) and/or ports 926, such as for enabling connection with a keyboard, a mouse, a pen, a voice input device, a touch input device, a display, speakers, a printer, or other I/O device.

The manufacturing management system 902 may also include a user interface 928. The user interface 928 may be utilized by an operator or one of the users 901 to access portions of the manufacturing management system 902. In some examples, the user interface 928 may include a graphical user interface, web-based applications, programmatic interfaces such as application programming interfaces (APIs), or other user interface configurations. The manufacturing management system 902 may also include a data store 930. In some examples, the data store 930 may include one or more data stores, databases, data structures, or the like for storing and/or retaining information associated with the manufacturing management system 902. Thus, the data store 930 may include databases, such as a customer information database 932, a model database 934, and a content item database 936.

The customer information database 932 may be used to retain information pertaining to customers of the manufacturing management system 902, such as the user 901. Such information may include, for example, customer account information (e.g., electronic profiles for individual users), demographic information for customers, payment instrument information for customers (e.g., credit card, debit cards, bank account information, and other similar payment processing instruments), account preferences for customers, shipping preferences for customers, purchase history of customers, capsule models, customer material preferences, and other similar information pertaining to a particular customer and sets of customers of the manufacturing management system 902. In some examples, the customer information may be encrypted and decrypted when needed using typical encryption techniques. In some examples, the customer information may be de-identified or anonymized and instead merely present generic profiles that can be selected from for manufacturing. In some examples, the information retained in the customer information database 932 may be shared with and/or received from the electronic marketplace.

The model database 934 may be used to store three-dimensional models of capsule designs. The model database 934 may be referenced when the manufacturing management engine 906 attempts to identify a particular three-dimensional item, or generate manufacturing instructions for a particular capsule. The model database 934 may be configured to store any suitable data in any suitable format (e.g., computer-aided drafting (CAD) file such as a STereoLithography file or .STL format) capable of storing a representation of a three-dimensional item.

The digital content item database 936 may be used to retain information about digital content items for which capsule designs are available. For example, the digital content item database 936 may include a table that includes all digital content items available for purchase in the electronic marketplace, information about the design of the capsule such as the release rate and residency time.

Figure 10:
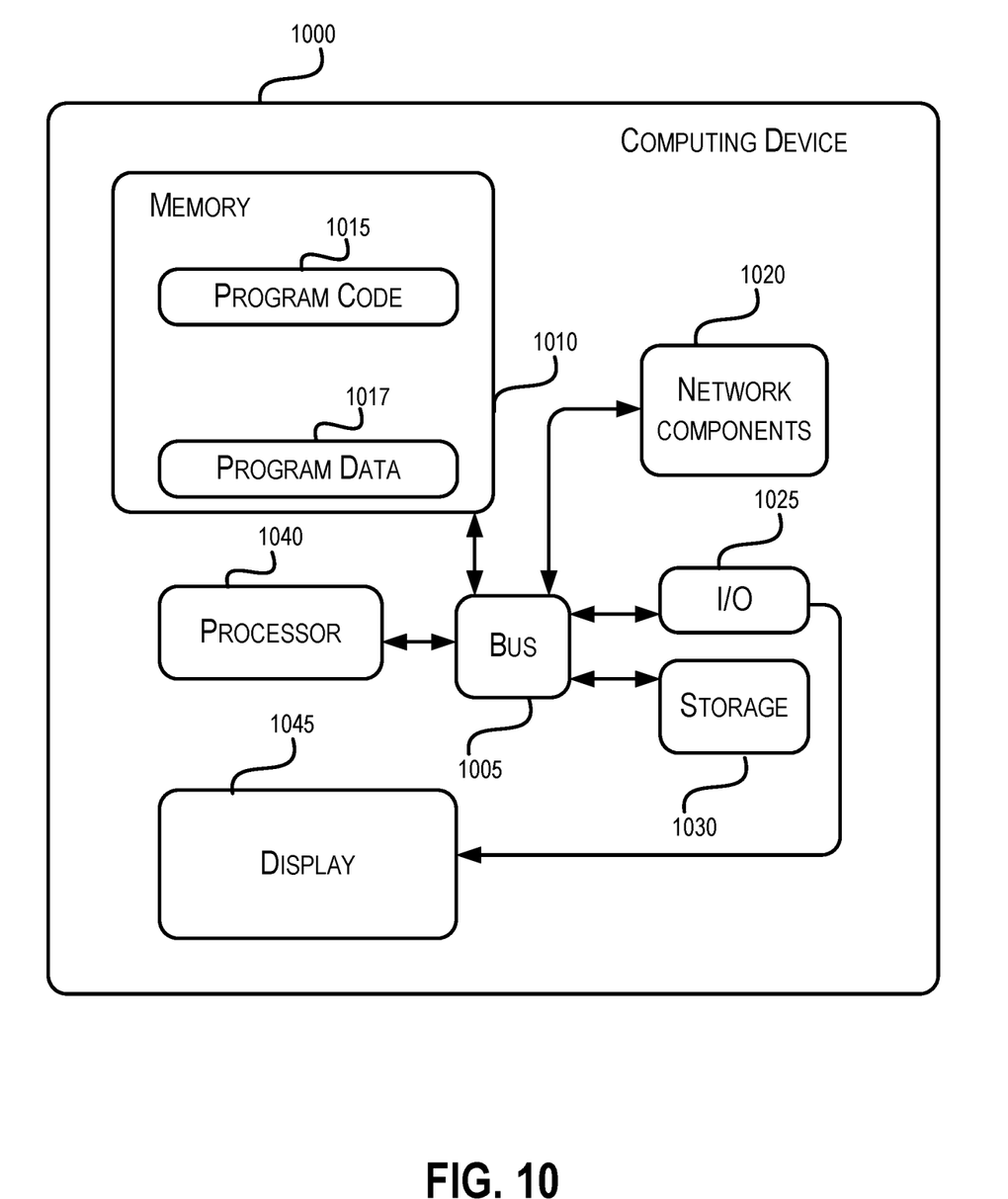
FIG. 10 depicts an example of a computing device for performing the methods described herein, according to at least some embodiments.

Any suitable computing system or group of computing systems can be used for performing the operations or methods described herein. FIG. 10 depicts an example of a computing device 1000. In an embodiment, a computing device, such as user device 904 or manufacturing management system 902 combines the one or more operations and data stores depicted as separate subsystems herein.

FIG. 10 illustrates a block diagram of an example of a computing device 1000. Computing device 1000 can be any of the described computers herein including, for example, user device 904 or manufacturing management system 902. The computing device 1000 can be or include, for example, an integrated computer, a laptop computer, desktop computer, tablet, server, or other electronic device.

The computing device 1000 can include a processor 1040 interfaced with other hardware via a bus 1005. A memory 1010, which can include any suitable tangible (and non-transitory) computer readable medium, such as RAM, ROM, EEPROM, or the like, can embody program components (e.g., program code 1015) that configure operation of the computing device 1000. Memory 1010 can store the program code 1015, program data 617, or both. In some examples, the computing device 1000 can include input/output ("I/O") interface components 1025 (e.g., for interfacing with a display 1045, keyboard, mouse, and the like) and additional storage 1030.

The computing device 1000 executes program code 1015 that configures the processor 1040 to perform one or more of the operations described herein. The program code 1015 may be resident in the memory 1010 or any suitable computer-readable medium and may be executed by the processor 1040 or any other suitable processor.

The computing device 1000 may generate or receive program data 1017 by virtue of executing the program code 1015. For example, capsule designs, drug characteristics, capsule characteristics, and patient treatment profiles are all examples of program data 1017 that may be used by the computing device 1000 during execution of the program code 1015.

The computing device 1000 can include network components 1020. Network components 1020 can represent one or more of any components that facilitate a network connection. In some examples, the network components 1020 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 1020 can be wired and can include interfaces such as Ethernet, USB, or IEEE 1394.

Although FIG. 10 depicts one computing device 1000 with a single processor 1040, the system can include any number of computing devices 1000 and any number of processors 1040. For example, multiple computing devices 1000 or multiple processors 1040 can be distributed over a wired or wireless network (e.g., a Wide Area Network, Local Area Network, or the Internet). The multiple computing devices 1000 or multiple processors 1040 can perform any of the steps of the present disclosure individually or in coordination with one another.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A method for producing a capsule comprising:
   determining a packing volume for packing a releasable agent into a capsule for patient treatment;
   determining a buoyancy volume for the capsule to provide buoyancy to the capsule;
   determining a capsule size based on the packing volume and the buoyancy volume;
   determining a configuration of one or more openings based on at least one physical property of the releasable agent or a releasable agent release rate, wherein the configuration comprises at least one of a number of the one or more openings or a size of at least one opening;
   generating a capsule design having an air compartment, releasable agent compartment, and at least one release outlet based on the packing volume, buoyancy volume, the one or more openings, and the size of the one or more openings; and
   generating manufacturing instructions for a manufacturing system to produce the capsule based on the capsule design.

2. The method of claim 1, wherein the buoyancy volume is between thirty-five and forty-five percent of a total volume of the capsule.

3. The method of claim 1, further comprising determining a thickness of an outer coating based at least in part on the releasable agent release rate, and wherein the manufacturing instructions comprise instructions for applying the outer coating to the capsule.

4. The method of claim 1, wherein the packing volume is determined based on a releasable agent release rate.

5. The method of claim 1, wherein the packing volume is determined based on a physical property of the releasable agent.

6. The method of claim 5, wherein the physical property of the releasable agent is at least one of:
   viscosity;
   density;
   solubility;
   absorption rate;
   a probability of caking;
   a force of compaction of the releasable agent;
   reactivity; or
   hygroscopicity.

7. The method of claim 1, further comprising determining the releasable agent release rate based on a patient treatment profile.

8. The method of claim 7, wherein the packing volume is determined based on a force of compaction and the releasable agent release rate.

9. The method of claim 1, further comprising manufacturing, based on the manufacturing instructions, the capsule.

10. A method of manufacturing a capsule, comprising:
    receiving manufacturing instructions based on a capsule design, the capsule design comprising:
    a first portion comprising a buoyancy chamber and a first interlocking feature;
    a second portion comprising;
    a chamber, the chamber defining an opening providing a conduit between an exterior and an interior of the chamber; and
    a second interlocking feature, the second interlocking feature configured to interface with the first interlocking feature to secure the first portion to the second portion and to fully enclose the chamber; and
    manufacturing, with a manufacturing system and based on the manufacturing instructions, a long release capsule formed of a gastric acid soluble material.

11. The method of claim 10, wherein the manufacturing system is at least one of:
    a three-dimensional printer using a filament of gastric acid soluble material;
    an injection molding system;
    a computer numerical control system;
    a casting system; or
    a vacuum forming system.

* * * * *